O. E. WALL.
WIND SHIELD CLEANER.
APPLICATION FILED JUNE 2, 1916.

1,227,100.

Patented May 22, 1917.

WITNESSES

INVENTOR
ORMOND E. WALL,
BY
ATTORNEYS

UNITED STATES PATENT OFFICE.

ORMOND E. WALL, OF HONOLULU, TERRITORY OF HAWAII.

WIND-SHIELD CLEANER.

1,227,100.  Specification of Letters Patent.  Patented May 22, 1917.

Application filed June 2, 1916. Serial No. 101,366.

*To all whom it may concern:*

Be it known that I, ORMOND E. WALL, a citizen of the United States, and a resident of the city of Honolulu, Territory of Hawaii, have made an Improved Wind-Shield Cleaner, of which the following is a specification.

My invention is an improved attachment for transparent wind-shields of automobiles for cleaning the outer sides of the same.

The chief features of the apparatus are an oscillating lever, a wiper attached to its extremities and thus adapted to reciprocate and sweep over the surface to be cleaned, an electric motor for operating said lever, and an extensible clamp adapted for attachment to the frame of a wind-shield and on which the other parts of the apparatus are operatively supported.

The details of construction, arrangement, and operation of the invention are as hereinafter described, and illustrated in the accompanying drawing, in which, Figure 1 is a perspective view of my improvement applied to the wind-shield of an automobile.

Figure 1:
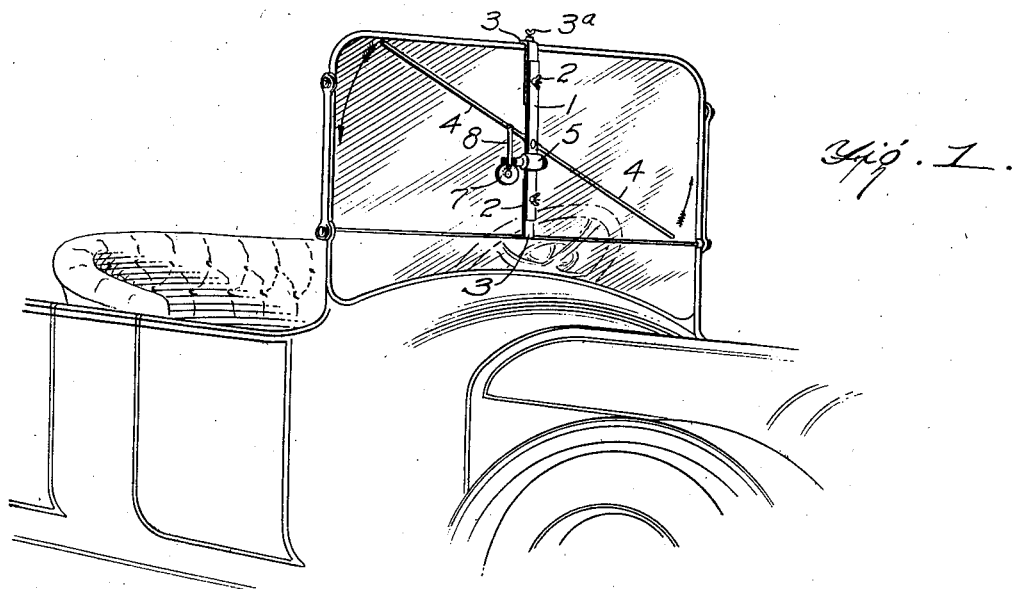

The apparatus is applied on the front or outer side of a wind-shield, the actively operating parts being attached to, and supported on, a vertical bar 1, which is formed of parts or sections adapted to slidable adjustment on each other, and secured or clamped in any adjustment by screws 2 which pass through slots in one of the adjustable sections of the bar.

The end portions of the bar are constructed with terminal claws 3 adapted to clasp on the top and bottom bars of a wind-shield frame, as shown in the several views. Clamp screws 3ª are applied to the said claws 3 to hold the clamping bar 1 firmly fixed on the wind-shield frame.

A two-armed oscillating lever 4 is journaled on the middle portion of the clamping bar 1, and on the rear or inner side of the same, and, in practice, rubber or other wipers of suitable construction will be detachably secured to the ends of the lever and arranged to work in frictional contact with the wind-shield.

The lever 4 is oscillated by its connection with an electric motor 5, whose casing is rigidly attached to the front or outer side of the clamp bar 1. Thus a worm 6 is fixed on the extended shaft of the motor 5 and meshes with a worm wheel 7, which is mounted rotatably on an arm extending from the motor frame or casing, and a connecting rod 8 operatively connects the lever 4 with such wheel 7.

Figures 2, 3:
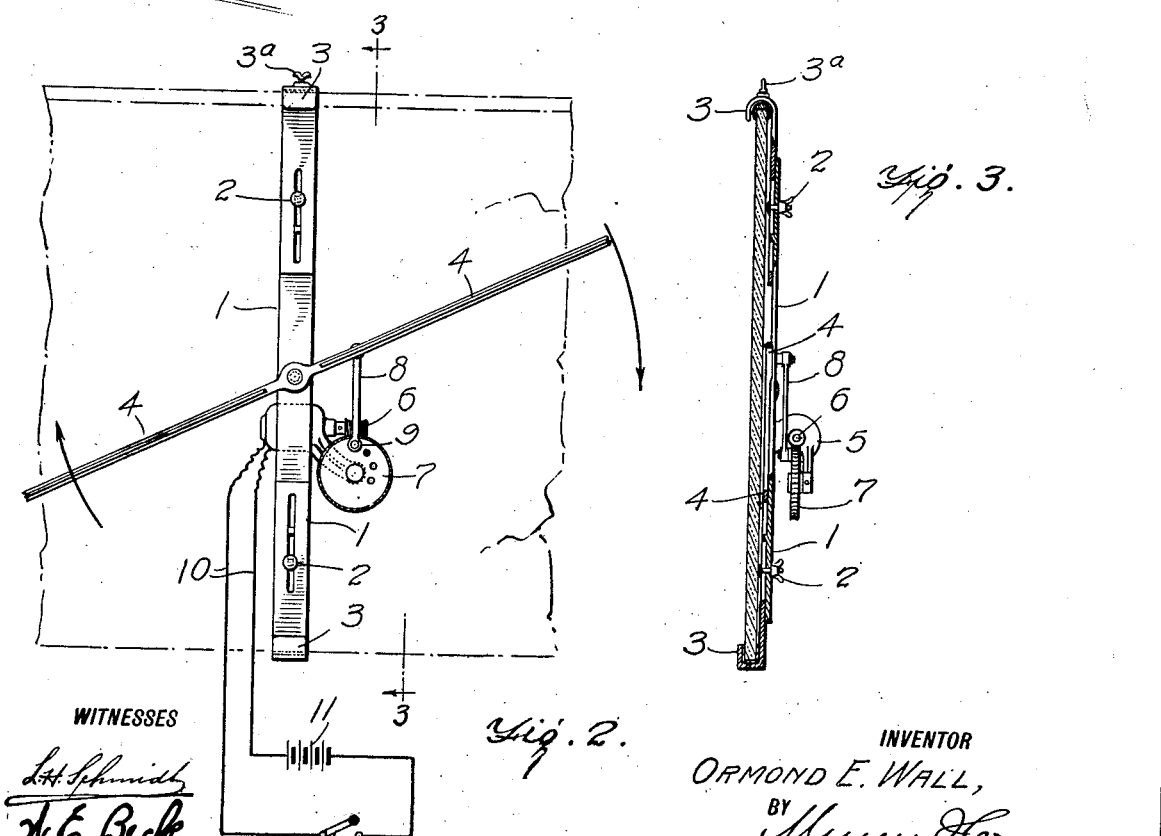
Fig. 2 is a rear face view of the apparatus.
Fig. 3 is a vertical section on line 3—3 of Fig. 2.

The lower end of the rod 8 is pivoted eccentrically on a wrist-pin 9 of the wheel 7 and the throw of the lever may be varied as desired, by adjusting said wrist-pin in holes located as shown in Fig. 2 at different distances from the center of the wheel.

The motor 5 is electrically connected by conductors 10 with a storage battery 11, and the circuit is opened or closed by a suitable switch 12, which, in practice is located in convenient proximity to the seat of the operator of the automobile.

It is apparent that upon closing the switch the motor 5 will be energized and rotation thereby imparted to the worm wheel 7, and through that medium the pivoted lever 4 will be oscillated so that its attached wipers will sweep up and down over the face of the wind-shield and on both sides of the central portion of the same, thus removing snow, dirt or moisture from considerable portions of the glass so that the operator as well as the passenger accompanying him may have a practically unobstructed view through the wind-shield.

My attachment is simple in construction and may be cheaply manufactured and easily attached or detached and is very effective in operation. It may obviously be readily applied to wind-shields already constructed and in use and may be made and sold as a separate and independent article of manufacture.

While the invention is specifically described as adapted for and applied to automobiles, it is apparent it may be also applied for cleaning windows of locomotive railway cars and the like.

I claim:

1. A wind shield cleaning apparatus comprising a bar secured vertically to the windshield frame, a lever pivoted on said bar adjacent to the wind-shield and provided with a wiper at its extremity, a rotatable device supported on the bar, and a rod connecting said device with the lever for oscillating the latter, as described.

2. A wind-shield cleaner comprising a bar adapted to be secured to a wind-shield frame, a wiper lever pivoted thereon and arranged parallel to the wind-shield, a rotary motor supported on the aforesaid bar, and means operatively connecting it with the lever for oscillating the same, as described.

3. A wind-shield cleaner comprising a bar adapted to be clamped on the top and bottom of a wind shield, a wiper lever pivoted on said bar in a plane parallel to the wind-shield, a motor and a gear supported on the bar, the gear being operatively connected with the lever, as described.

4. A wind-shield cleaning apparatus comprising an extensible bar made in adjustable sections, the outer ones being adapted for engagement with the wind-shield frame, means for clamping the sections to each other in any desired adjustment, a wiper pivoted on the bar and adapted to oscillate in a plane parallel with that of the latter, an electric motor fixed on the bar and having an extended shaft provided with a worm, a worm gear meshing with said worm and mounted rotatably on the motor casing, and a rod connecting the worm gear with the wiper lever, as described.

ORMOND E. WALL.